(12) United States Patent
Belanger et al.

(10) Patent No.: US 8,163,096 B2
(45) Date of Patent: Apr. 24, 2012

(54) ROLLOVER CAR WASH FOR LARGE VEHICLES

(75) Inventors: Michael J. Belanger, Novi, MI (US); Tom E. Weyandt, Northville, MI (US); Curtis S. Prater, Warren, MI (US); David L. Togneti, Howell, MI (US)

(73) Assignee: Belanger, Inc., Northville, MI (US)

( * ) Notice: Subject to any disclaimer, the term of this patent is extended or adjusted under 35 U.S.C. 154(b) by 809 days.

(21) Appl. No.: 11/930,796

(22) Filed: Oct. 31, 2007

(65) Prior Publication Data

US 2008/0047593 A1    Feb. 28, 2008

Related U.S. Application Data (62) Division of application No. 10/828,088, filed on Apr. 20, 2004, now Pat. No. 7,337,791.

(51) Int. Cl.
*B08B 3/02* (2006.01)
*B08B 3/10* (2006.01)
*B05C 5/00* (2006.01)

(52) U.S. Cl. ............. 134/18; 134/10; 134/34; 134/123; 237/59; 239/135; 239/284.1

(58) Field of Classification Search ................. 134/123; 239/135, 284.1; 237/59–62
See application file for complete search history.

(56) References Cited

U.S. PATENT DOCUMENTS

| | | | |
|---|---|---|---|
| 3,464,631 A * | 9/1969 | Lieffring et. al. ............. 239/135 |
| 3,911,938 A | 10/1975 | Wiltrout | |
| 4,104,164 A | 8/1978 | Chelton | |
| 4,168,231 A | 9/1979 | Allen et al. | |
| 4,168,232 A | 9/1979 | Allen et al. | |
| 4,418,651 A | 12/1983 | Wyatt | |
| 4,652,368 A | 3/1987 | Ennis et al. | |
| 5,029,758 A | 7/1991 | Chayer | |
| 5,093,012 A | 3/1992 | Bundy et al. | |
| 5,498,329 A | 3/1996 | Lamminen et al. | |
| 5,853,494 A | 12/1998 | Andersson | |
| 5,875,565 A | 3/1999 | Bowman | |
| 6,372,053 B1 * | 4/2002 | Belanger et al. ................ 134/34 |
| 6,464,063 B2 * | 10/2002 | Colicchio .................... 194/242 |
| 6,571,807 B2 * | 6/2003 | Jones .......................... 134/56 R |
| 6,924,257 B2 | 8/2005 | Klos et al. | |
| 2003/0015222 A1 * | 1/2003 | Jones et al. ...................... 134/18 |

FOREIGN PATENT DOCUMENTS

WO    WO98/58826    * 6/1998

* cited by examiner

*Primary Examiner* — Michael Kornakov
*Assistant Examiner* — Natasha Campbell
(74) *Attorney, Agent, or Firm* — Young Basile Hanlon & MacFarlane PC (57) ABSTRACT

A car wash system for large vehicles, such as trucks and busses, in which the arrival of a vehicle initiates a process of directing hot water from a supply tank through a relatively long supply line to a spray system. Water standing in the supply line is prevented for a time from going to the spray nozzles and, instead, is directed back to the source. This allows the temperature in the line to reach a predetermined desired value before washing is started. Water is recirculated at a faster rater than it is dispensed once the desired temperature has been reached.

5 Claims, 11 Drawing Sheets

ROLLOVER CAR WASH FOR LARGE VEHICLES

RELATED APPLICATION

This application is a divisional of U.S. application Ser. No. 10/828,088 on Apr. 20, 2004, now U.S. Pat. No. 7,337,791, currently pending.

FIELD OF THE INVENTION

This invention relates to car wash apparatuses, more particularly to car wash apparatuses of the rollover type, and yet more particularly to rollover car wash apparatuses especially suitable for use in washing large vehicles such as buses and trucks.

BACKGROUND OF THE INVENTION

Car wash apparatuses are in common usage throughout the world for wet washing the exterior surfaces of various forms of automotive vehicles.

One of the most popular forms of car wash apparatus is the so called "rollover" washer which is characterized by a washing structure which moves over or around a vehicle parked in a pre-specified wash area.

In one particularly effective form of rollover car washer, a carriage moves over the vehicle along an overhead track structure and a pair of opposed nozzle spray arms pivotally mounted on the carriage act upon side and upper surfaces of the vehicle in response to linear movement of the carriage along the track structure and pivot in a butterfly fashion as the carrier reaches the respective ends of the vehicle to act upon the front and rear surfaces of the vehicle.

Whereas this particular form of rollover car wash is effective in washing relatively small vehicles such as automobiles and small trucks, problems arise when this form of rollover washer is applied to the washing of large vehicles such as large buses and large trucks. Specifically, because of the necessarily long length of the washer commensurate with the long length of the vehicles being washed, problems arise in maintaining the washing water at a desirable hot temperature as the carriage carrying the spray arms moves to a position remote from the hot water source. Further, because the washer requires an excessively long track structure to allow the carriage to traverse the entire length of the large vehicles, problems arise with respect to physically constructing the long track structure without resort to bulky and expensive designs. Further, since the spray arms for washing the large vehicles are necessarily themselves quite large and therefore quite heavy, problems arise with respect to providing adequate bearing structure to support the pivoting movement of the spray arms. Further, again due to the long length of the washer structure, problems arise in the delivery of the necessary fluids and other supplies to the carriage as the carriage moves along its lengthy path. Further, since the washer must handle a variety of large vehicles including vehicles with windshields positioned remotely from the front end of the vehicle, problems arise with respect to providing effective cleaning of the windshield surface areas.

SUMMARY OF THE INVENTION

The present invention provides a vehicle washer apparatus that is especially suitable for washing very large vehicles such as large trucks and large buses.

According to an important feature of the invention, the wash system includes a source of hot water; a spray device for delivering water to the surface of a vehicle positioned in the vehicle wash area; a pump assembly having an input connected to the hot water source and an output; and control means operative to selectively connect the pump assembly output to the spray device or return the pump assembly output to the hot water source. This arrangement allows the water arriving at the spray device from the hot water source to be selectively recirculated to the hot water source until the temperature reaches a predetermined desired temperature.

According to a further feature of the invention, the wash system further includes a conduit network interconnecting the hot water source and the pump assembly input, the pump assembly output and the spray device, and the pump assembly output and the hot water source; and the control means includes valve means in the conduit network between the pump assembly output and the spray device operative to selectively route the pump assembly output to the spray device or return the pump assembly output to the hot water source. This specific valving arrangement facilitates the recirculation of the water to the hot water source.

According to a further feature of the invention, the control means is operative in response to the arrival of a vehicle at the vehicle wash area to actuate the pump assembly, signal the valve means in a sense to return the pump assembly output to the hot water source until the water reaches a predetermined temperature, and thereafter signal the valve means in a sense to route the pump assembly output to the spray device. This specific control arrangement insures that the water reaching the spray device is promptly heated to a desired temperature in response to the arrival of a vehicle in the wash area.

According to a further feature of the invention, the pump assembly includes a variable speed pump and a variable speed drive means for the pump and the control means further includes means operative to energize the variable speed drive means in a sense to operate the pump at a relatively high speed when the pump output is being returned to the hot water source and energize the variable speed drive means in a sense to operate the pump at a relatively low speed when the pump output is being delivered to the spray device. The use of a variable speed pump allows the water to be rapidly recirculated and rapidly heated to the desired, predetermined temperature.

According to a further feature of the invention, the hot water source includes a boiler and a storage tank receiving the output of the boiler, the pump assembly input is connected to the storage tank, and the pump assembly output is selectively returned to the storage tank. This arrangement allows the recirculation feature to be incorporated in a system including a standard boiler and storage tank arrangement.

According to a further feature of the invention, the system includes a rail structure and a carriage mounted on the rail structure for reciprocal movement over the vehicle wash area and the spray device and the valve means are carried by the carriage. This specific arrangement allows the careful and selective control of the temperature of the water arriving at the spray device.

The invention further provides a method of maintaining a supply of hot water at a predetermined temperature at a spray device of a vehicle wash system of the type including a fixed source of hot water and conduit means interconnecting the spray device and the hot water source. According to the invention method, a valve mechanism is provided in the conduit means; the arrival of a vehicle at a wash area of the wash system is sensed; water arriving at the valve mechanism from the hot water source is routed back to the hot water source until the water arriving at the valve mechanism has achieved the predetermined temperature; and water thereafter arriving at the valve mechanism is routed to the spray device for application at the predetermined temperature to the vehicle. This methodology allows the hot water to be maintained at a predetermined temperature even in large wash systems where the conduit means interconnecting the spray device and the hot water source is of necessity quite long.

The invention further provides a frame structure for supporting a carriage for reciprocal movement over a vehicle wash area. According to the invention, the frame structure comprises a plurality of gantries positioned at longitudinally spaced locations over the vehicle wash area and each including vertical members upstanding from the floor surface and an upper cross member interconnecting upper ends of the vertical members; and a pair of parallel carriage guide rails mounted on the gantries in a position passing beneath the upper cross member of one of the gantries by a distance sufficient to allow a carriage moving along the guide rails to pass beneath the upper member of the one gantry. This arrangement facilitates the provision of a long uninterrupted track surface to facilitate the movement of a carriage from front to rear of a large vehicle positioned in the vehicle wash area.

According to a further feature of the invention, the guide rails are mounted on the one gantry by a pair of connector frame members each including a horizontal leg extending inboard for a connection to a respective one of the guide rails. This specific arrangement further facilitates the provision of an uninterrupted track surface.

According to a further feature of the invention, each connector frame member has an L-configuration and further includes a vertical leg connected to and extending downwardly from the upper cross member of the one gantry and the vertical leg of each connector frame member is mounted on the upper cross member for laterally adjustable movement. This specific arrangement allows the ready adjustment of the lateral position of the guide rails to match the track of the carriage.

According to a further feature of the invention, each guide rail includes a first longitudinal section and a second longitudinal section having an end butted against an end of first section to form a splice joint; and the horizontal leg of each connector frame member is connected to the respective guide rail at the splice joint. This specific support arrangement further facilitates the provision of an uninterrupted guide rail surface.

According to a further feature of the invention, each guide rail has a hollow aspect; the inboard end of each horizontal leg is butted against an outboard face of the respective guide rail proximate the splice joint; coacting wedge members are positioned in the hollow aspect of each guide rail proximate the splice joint; and the coacting wedge members are relatively moveable by rotation of a threaded fastener member carried by the inboard end of the horizontal leg of the respective connector frame member. This specific wedge arrangement allows the longitudinal guide rail sections to be spliced together in a manner that does not interrupt the upper surface of the guide rail assembly.

According to a further feature of the invention, each wedge member is elongated and includes a first portion positioned in the first longitudinal section of the respective guide rail and a second portion positioned in the second longitudinal section of the respective guide rail. This arrangement further facilitates the splicing together of the guide rail sections while maintaining an uninterrupted upper guide rail surface.

According to a further feature of the invention, there are three wedge members positioned in each guide rail including an upper member positioned against an upper face of the respective guide rail, a lower member positioned against a lower face of the respective guide rail, and a central member positioned between the upper and lower members and having upper and lower wedge faces wedgingly coacting respectively with a lower wedge face of the upper member and an upper wedge face of the lower member. This specific wedge member arrangement further facilitates the splicing together of the longitudinal sections of the guide rails.

The invention further provides a washer system wherein hot water is effectively delivered to the carriage even as the carriage moves over large distances extending from the front to rear ends of large vehicles positioned in the wash area. The wash system according to this aspect of the invention includes a fixed source of hot water removed from the wash area; a rail structure extending over the wash area; a carriage mounted for reciprocal movement on the rail structure over the wash area between a forward position and a rearward position; a spray device carried by the carriage; an elongated flexible carrier member having a rearward end fixed to a point on the rail structure and a forward end connected to the carriage and assuming a folded configuration during at least a portion of the movement of the carriage along the rail structure; and a water conduit extending from the hot water source to the rail structure point and thereafter threaded through the carrier to the carriage for connection to the spray device. This arrangement allows hot water to be effectively delivered to the spray device even as the carriage moves from front to rear of a large vehicle positioned in the wash area.

According to a further feature of the invention, the rail structure includes a trough extending along the rail structure and the carrier is positioned in the trough and folds and unfolds in the trough during the movement of the carriage along the rail structure. This specific arrangement facilitates the folding and unfolding of the carrier.

According to a further feature of the invention, the carrier has a chain configuration including a plurality of pivotally interconnected links. This specific construction facilitates the folding and unfolding of the carrier.

According to a further feature of the invention, a plurality of conduits are threaded through the carrier for delivering various ingredients or energies to the carriage for use in washing a vehicle positioned in the wash area. This arrangement allows all of the necessary ingredients required at the carriage to be effectively delivered to the carriage even as the carriage moves over the lengthy path required to wash the entirety of a large vehicle positioned in the wash area.

The invention further provides improved bearing structure for supporting the nozzle spray arm of a rollover type washer. This aspect of the invention is applicable to a wash system including a rail structure extending over the wash area, a carriage mounted for reciprocal movement along the rail structure, and a spray arm pivotally mounted on the carrier and including a pivot structure at an inboard end thereof journaled in a bearing structure carried by the carriage, and at least one spray device mounted on the arm for directing washer fluid against a vehicle positioned in the wash area. According to this aspect of the invention, the bearing structure includes an upper bearing journaling an upper portion of the pivot structure and a lower bearing journaling a lower portion of the pivot structure. This specific arrangement allows the provision of adequate bearing support for even the very large nozzle arms required to wash large vehicles.

According to a further feature of the invention, the carriage includes a frame structure; the upper bearing is mounted on the carriage frame structure; and the lower bearing is mounted on a support plate suspended beneath the carriage frame structure. This arrangement provides a ready and convenient means of providing the upper and lower bearing support for the pivot structure of the nozzle arm.

According to a further feature of the invention, the wash system further includes a second arm, pivotally mounted on the carriage and including a pivot structure at its inboard end and a spray device mounted on the second arm and the second arm includes a bearing structure including an upper bearing mounted on the carriage frame structure and journaling an upper portion of the pivot structure of the second arm and a lower bearing mounted on the support plate and journaling a lower portion of the pivot structure of the second arm. This arrangement allows the upper and lower bearing structure to accommodate the pivot structure of both arms of a butterfly type washer.

The invention further provides an arrangement to facilitate the washing of large vehicles having recessed windshields. This aspect of the invention relates to a wash system of the type including a rail structure extending over the wash area, a carriage mounted for reciprocal movement along the rail structure between a forward position and a rearward position, an arm pivotally mounted on the carriage, and at least one spray device mounted on the arm for directing washing fluids against a vehicle positioned in the wash area. According to this aspect of the invention, the wash system further includes a further spray device in the form of a nozzle carried by the carriage and operative to direct fluid downwardly and rearwardly against the windshield of a vehicle positioned in the wash area. This arrangement allows even a recessed windshield to be effectively cleaned.

According to a further feature of the invention there are a plurality of further spray devices in the form of a plurality of laterally spaced nozzles mounted on the carriage and operative to direct a plurality of fluid streams downwardly and rearwardly against laterally spaced locations on the vehicle windshield. This arrangement insures that the entire lateral expanse of the recessed windshield will be effectively cleaned.

Other applications of the present invention will become apparent to those skilled in the art when the following description of the best mode contemplated for practicing the invention is read in conjunction with the accompanying drawing.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

The rollover washer of the invention is typically installed in a building structure 10 and, broadly considered, includes a frame structure 12, a carriage assembly 14, an equipment room assembly 16, and a supply assembly 18.

Figure 1:
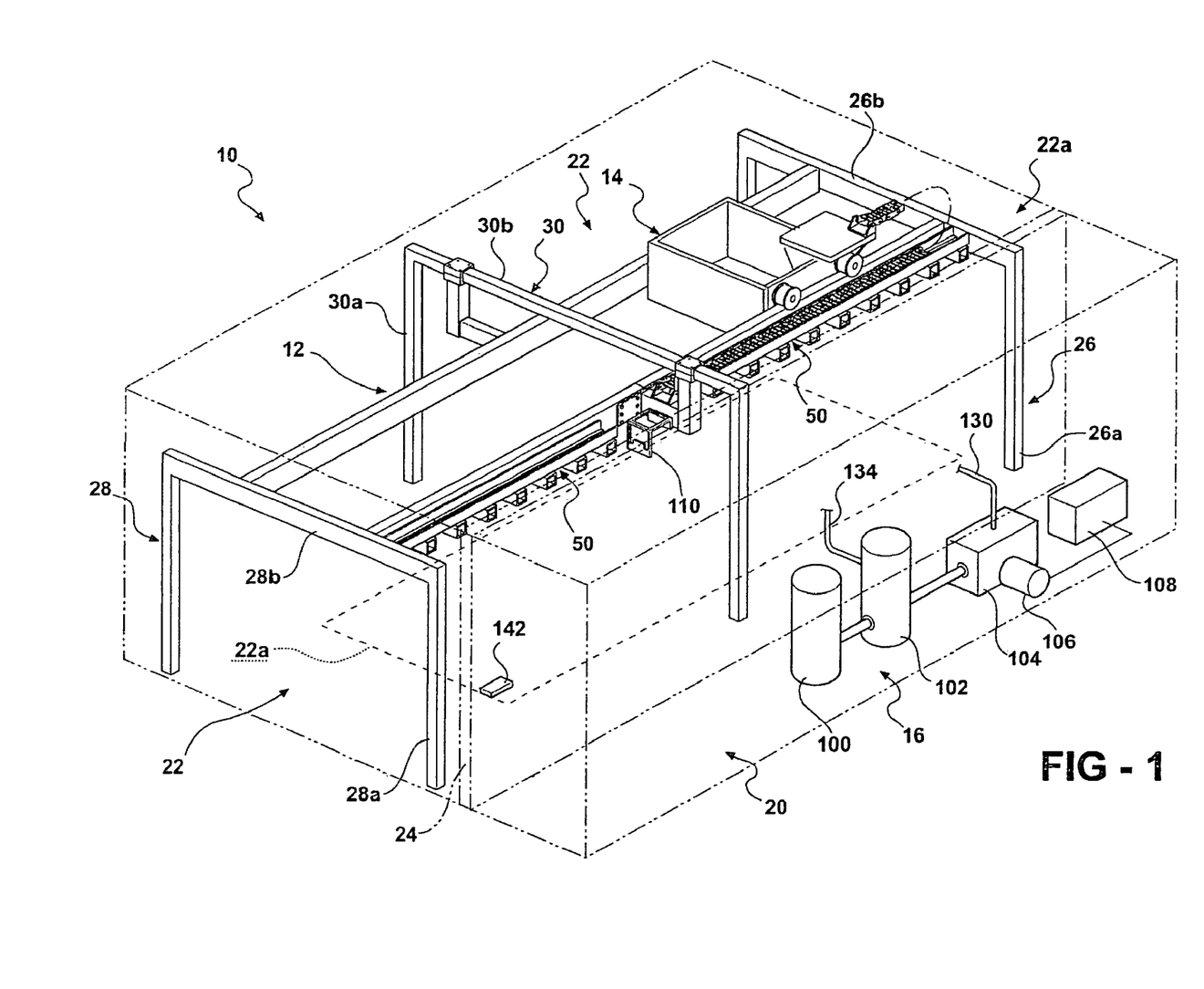
FIG. 1 is a perspective schematic view showing the installation of the invention washer in a typical structure.

Building structure 10 (FIG. 1) typically includes an equipment room 20 and a wash bay 22 positioned parallel to the equipment room and separated from the equipment room by a partition wall 24. The wash bay 22, may for example, have a length between 45' and 75' whereby to accommodate even very large vehicles such as eighteen wheel tractor-trailer type trucks.

Figure 12:
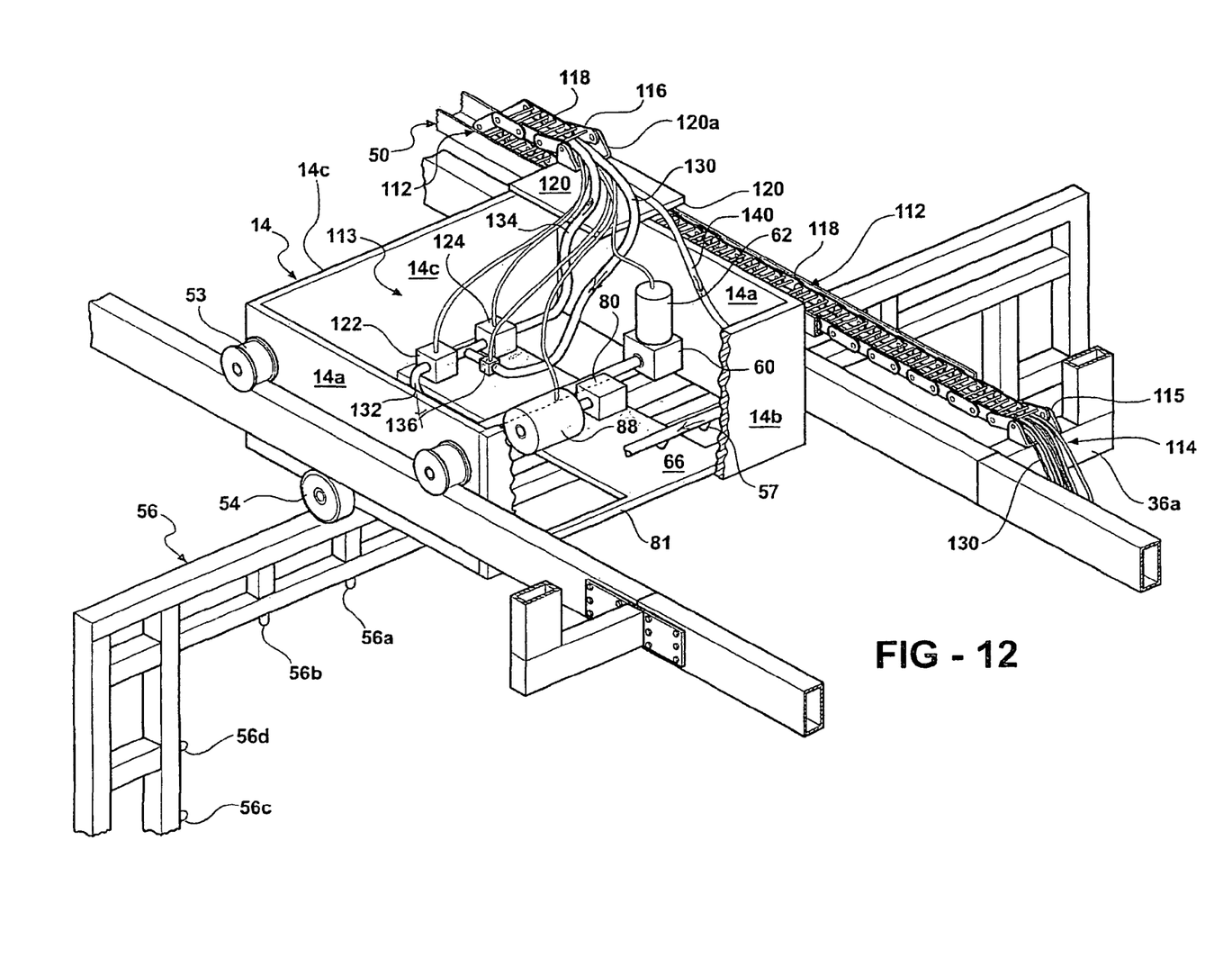
FIG. 12 is a fragmentary perspective view showing further details of the manner in which the various energies are delivered to the carriage.
Figure 13:
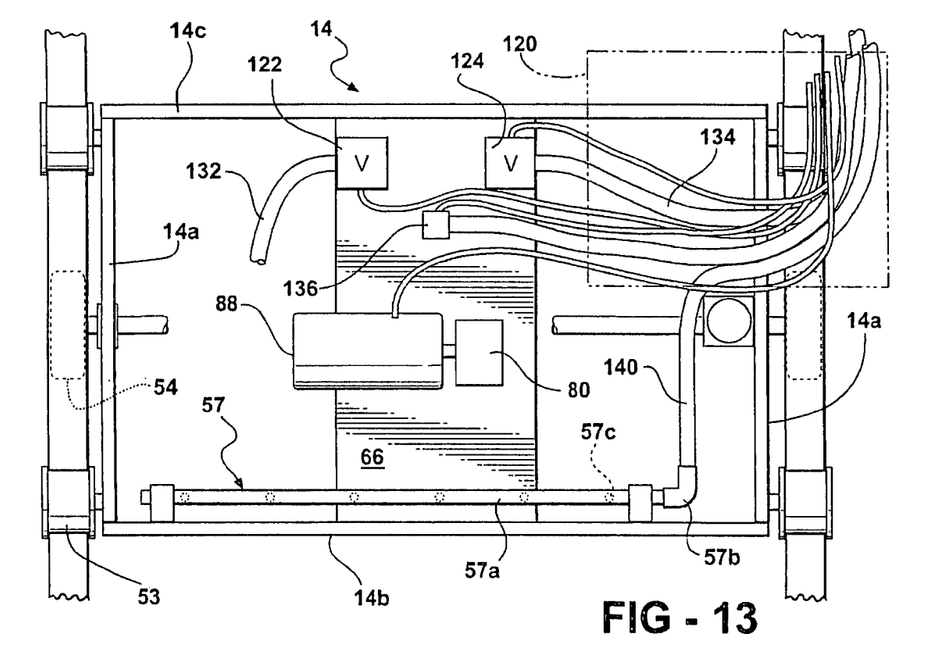
FIG. 13 is a somewhat schematic plan view further illustrating the delivery of the various energies to the carriage.
Figure 14:
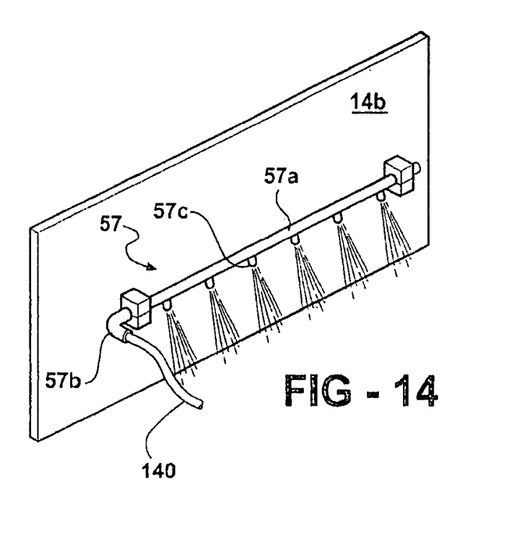
FIGS. 14, 15 and 16 are detail views illustrating a windshield washer arrangement carried by the carriage.
Figure 15:
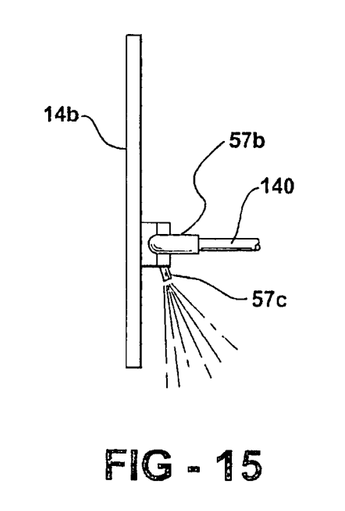

Frame structure 12 (FIGS. 2, 3 and 12) is of the gantry type and includes an entry gantry 26, an exit gantry 28, and a center gantry 30.

Figure 2:
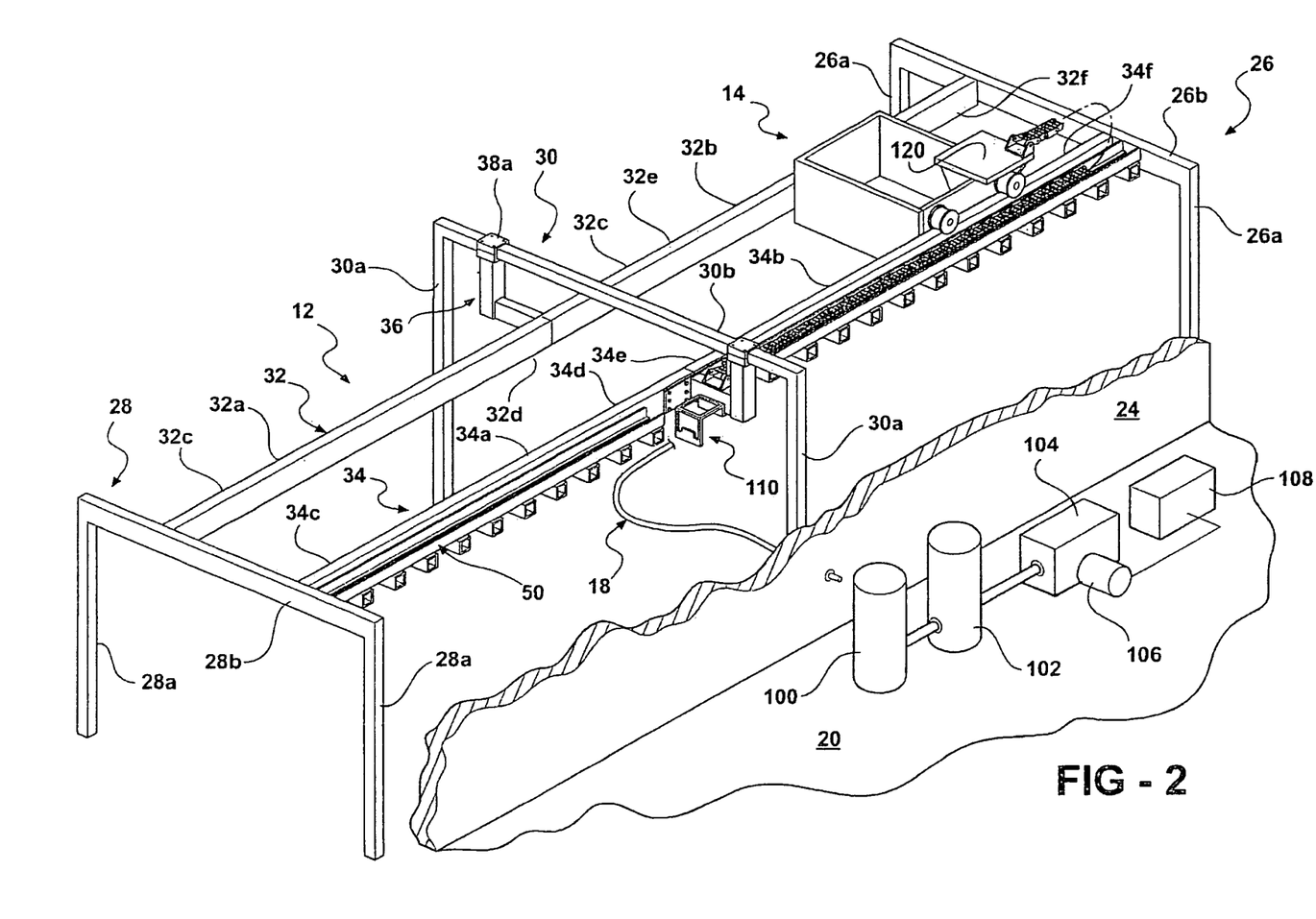
FIG. 2 is a perspective fragmentary view showing a frame structure and a carriage supported by the frame structure.

Entry gantry 26 includes a pair of laterally spaced vertical post members 26a upstanding from the floor surface of the wash area and an upper cross member 26b interconnecting upper ends of the vertical post members.

Exit gantry 28 includes a pair of laterally spaced vertical post members 28a upstanding from the floor surface of the wash area and an upper cross member 28b interconnecting the upper ends of the vertical post members.

Center gantry 30 includes a pair of laterally spaced vertical post members 30a upstanding from the floor surface of the wash area and an upper cross member 30b interconnecting upper ends of the vertical post members.

Post members 30a are significantly higher than post members 26a, 28a so that cross member 30b is positioned significantly above cross members 26b, 28b.

Frame structure 12 further includes a pair of parallel carriage guide rails 32, 34 mounted on the gantries in a position passing beneath the upper cross member 30b of the middle gantry. Each guide rail is a composite structure comprising rail sections arranged end to end in butting engagement. Specifically, rail 32 comprises a first longitudinal section 32a and a second longitudinal section 32b and rail 34 comprises a first longitudinal section 34a and a second longitudinal section 34b. The forward end 32c of section 32a is butted to cross member 28b; the rear end 32d of member 32a is butted against the front end 32e of member 32b; and the rear end 32f of member 32b is butted to cross member 26b. The front end 34c of member 34a is butted to cross member 28b; the rear end 34d of member 34a is butted to the front end 34e of member 34b, and the rear end 34f of member 34b is butted to cross member 26b.

The frame structure further includes a pair of L-shaped connector members 36 (FIGS. 3, 5, 6 and 7) each including a vertical member 36a and a horizontal member 36b and a plate 36c secured to the free inboard end of the horizontal member. Each connector member 36 is mounted for lateral adjusting movement along the upper cross member 30b via a suitable clamp assembly 38a/38b. Plate 36c of each connector member coacts with a wedge assembly 40 (FIG. 4) to maintain end 32d of member 32a in butting engagement with end 32e of member 32b while providing an uninterrupted horizontal upper surface for the rail assembly.

Figures 3, 4, 5:
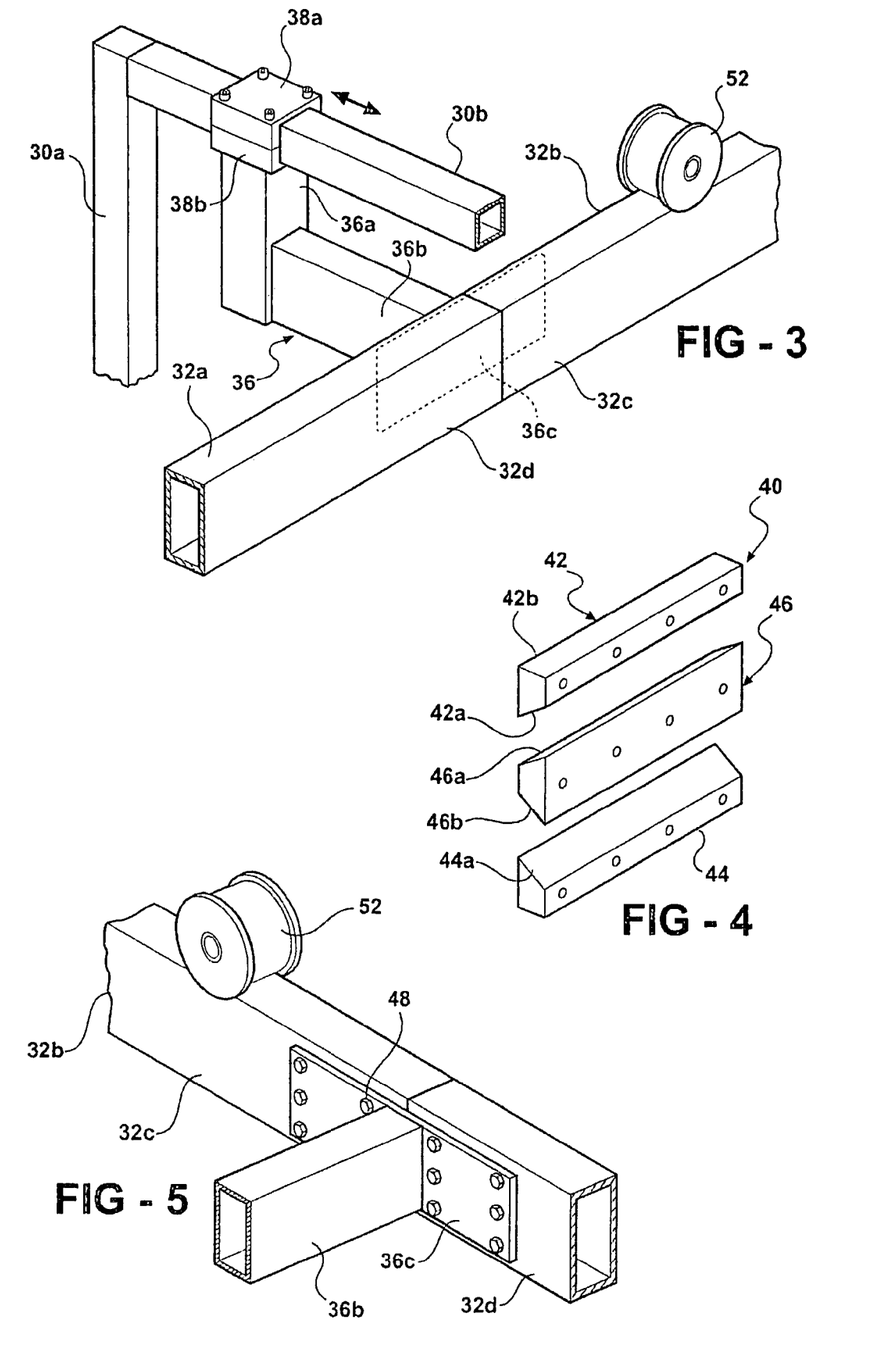
FIGS. 3, 4, 5, 6 and 7 are detail views showing the manner in which rail sections of the frame structure are joined together.
Figure 6:
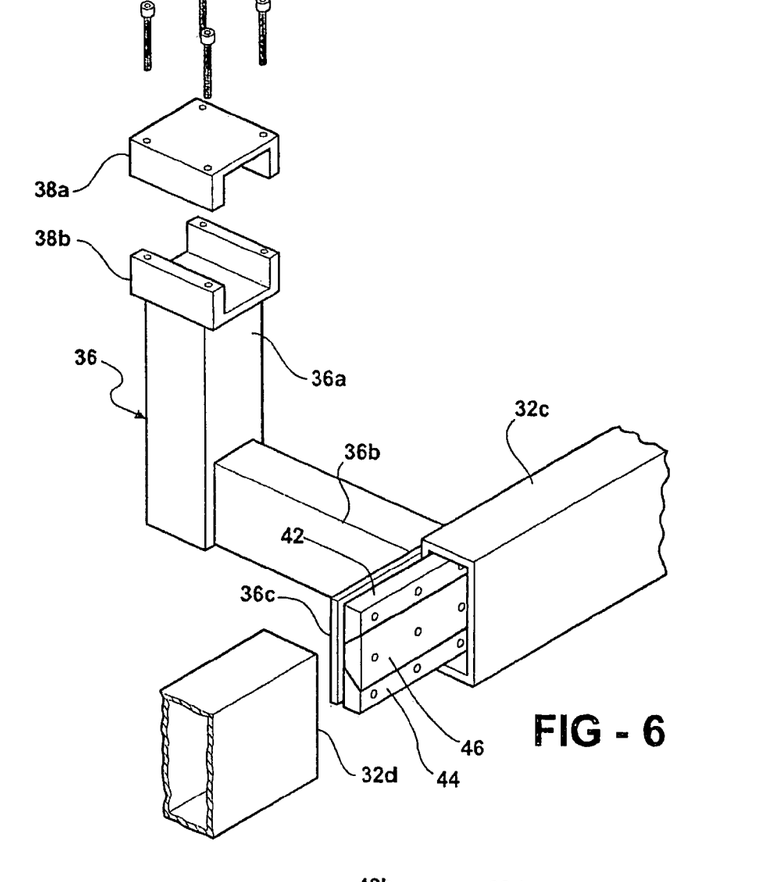
Figure 7:
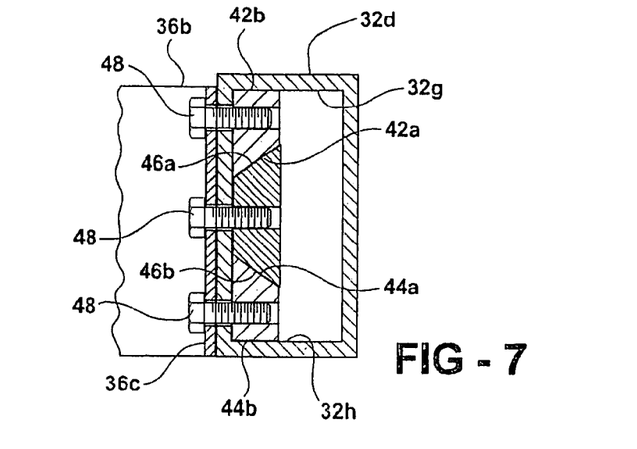

Each wedge assembly 40 includes an upper wedge member 42, a lower wedge member 44, and a central wedge member 46. Central wedge member 46 includes an upper wedge face 46a for wedging coaction with a lower wedge face 42a on upper member 42 and a lower wedge face 46b for wedging coaction with an upper wedge face 44a on lower member 44.

To assembly a respective connector member 36 to a respective rail assembly proximate the splice joint, the respective plate 36c is positioned against the outboard face of the rail member proximate the splice joint; one end portion of members 42, 44 and 46 is inserted into the open end of rail end 32c with wedge faces 46a and 42a in wedging coaction and wedge faces 46b and 44a in wedging coaction; bolts 48 are passed through apertures in the respective plate 36c and through aligned apertures in the outer wall of the rail end 32e for threaded engagement with threaded bores in the respective wedge members; the bolts are tightened to move the wedge members into wedging coaction and to specifically press the upper face 42b of the upper wedge member against an upper face 32c of the rail and press the lower face 44b of the lower wedge member against a lower face 32h of the rail; the end 32d of the rail 32a is slipped over the projecting end portions of the wedge members and into abutting engagement with the end 32c of rail 32b; further bolts 48 are passed through apertures in the respective plate 36c and through aligned apertures in the outer wall of end 32d for threaded engagement with threaded bores in the wedge members 42, 44 and 46; and the further bolts 40a are tightened to lock the wedge members into engagement with the end 32d and fixedly splice the end 32d to the end 32c with a smooth, uninterrupted upper surface of the rail assembly. If desired, each spliced joint may now be welded along the respective edges of the joint whereafter any weld splatter and excess may be ground off to insure a smooth, uninterrupted upper surface of the rail assembly.

Note that vertical connector members 36a have a length sufficient to position the rail structures 32, 34 sufficiently below the cross member 30b to allow a carriage 14 traveling along the rail structure to pass freely beneath the cross member 30b.

Frame structure 12 further includes a trough structure 50 (FIGS. 12, 17, 18 and 19) positioned along the outboard face of guide rail assembly 34. Trough 50 is constituted by a plurality of longitudinally spaced support bars 51 suitably and fixedly secured to the outboard face of the rail assembly 34 and a pair of L-shaped side plates 52 fixedly secured to the upper face of the support rods. Trough 50 may be provided in sections and may for example include a rear section positioned outboard of rail member 34b and a front section positioned outboard of rail member 34a with the inboard ends of the respective troughs positioned proximate opposite faces of the horizontal member 36b of the connector member 36 supporting the rail 34.

Carriage assembly 14 (FIGS. 8, 9, 10, 12 and 13) has a generally rectangular box configuration and includes side walls 14a, front wall 14b, rear wall 14c, upper longitudinally spaced wheels 53 mounted on side walls 14a and rollably guiding on the upper face of the guide rails 32, 34, lower tires 54 mounted on side walls 14a and rollably engaging the underface of the guide rails, a pair of nozzle spray arms 56 each having a pivot plate 56a (FIG. 8) at its inboard end, a windshield washer spray assembly 57, and a bearing structure 58 mounting the inboard ends of the nozzle spray arms for pivotal movement in butterfly fashion. A gearbox 60 driven by an electric motor 62 drives an axle 64 which drivingly engages the tires 54 whereby to propel the carriage along the guide rails in response to actuation of the motor.

Figure 8:
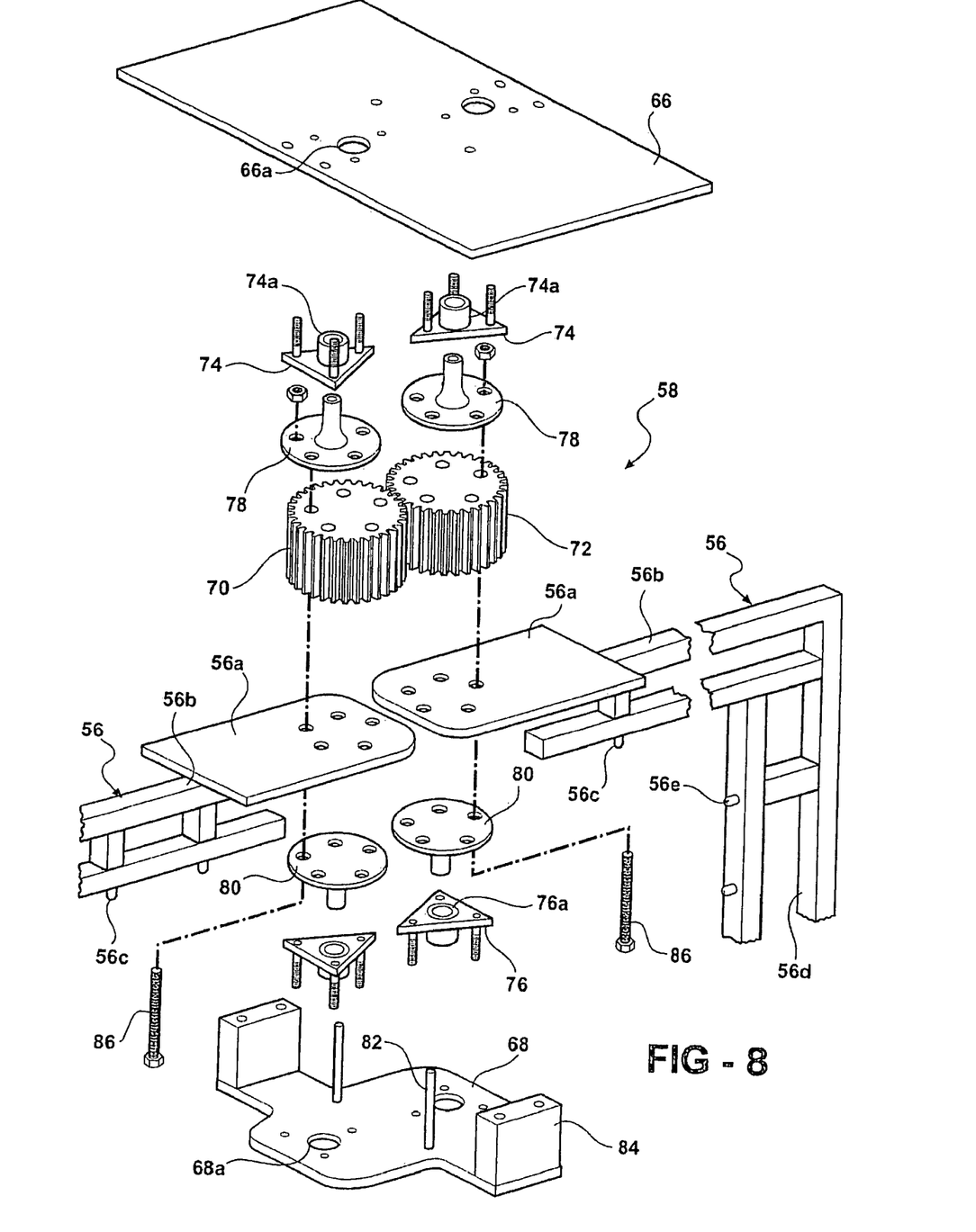
FIG. 8 is an exploded view of a bearing structure utilized to support spray arms of the washer.
Figures 9, 10:
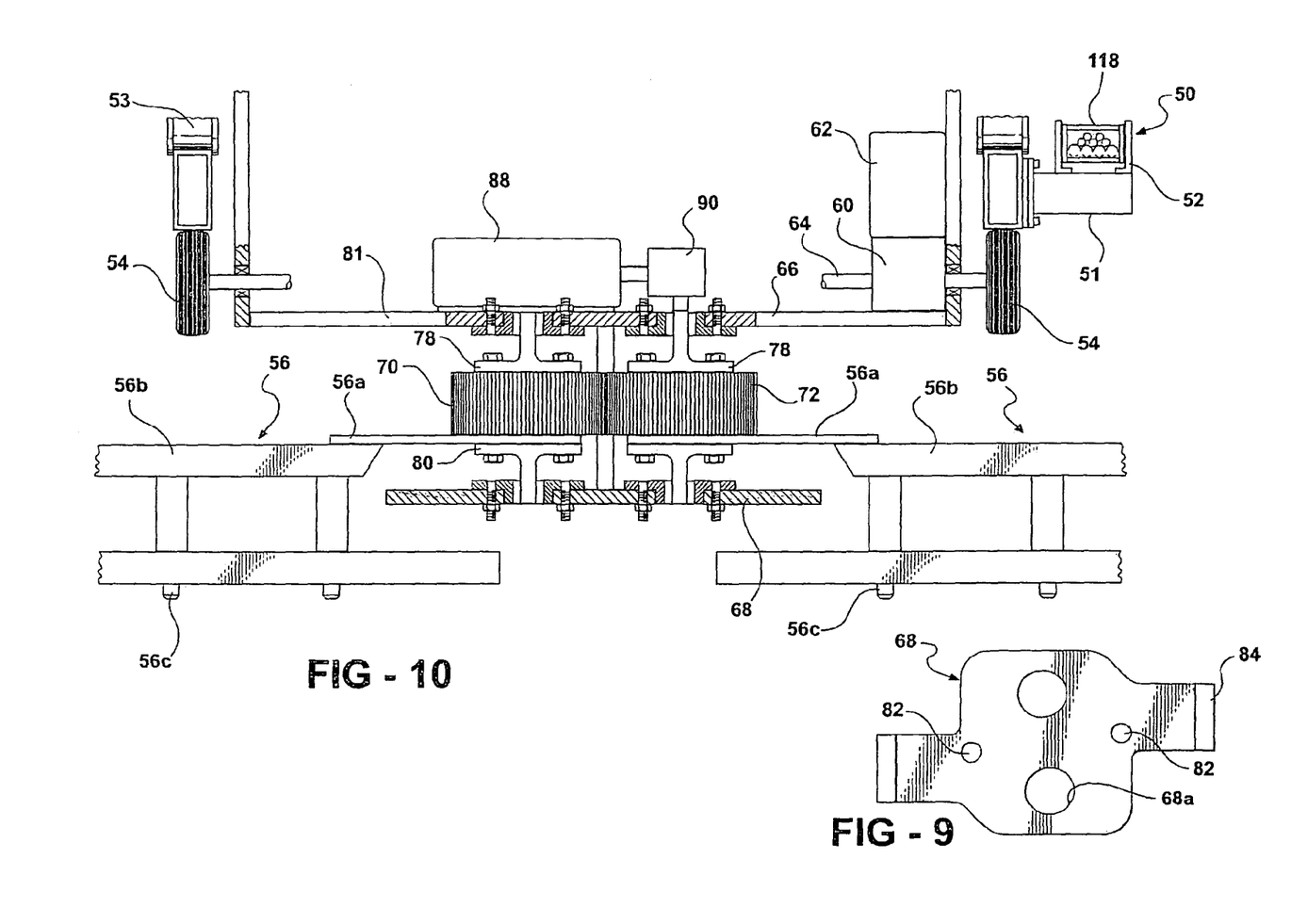
FIG. 9 is a detail view of a support plate utilized in the bearing structure.
FIG. 10 is a cross sectional view showing the bearing structure.

Each spray arm 56 has an L-configuration and includes a horizontal portion 56b, defining laterally spaced downwardly directed nozzles 56c, and a vertical portion 56d, defining vertically spaced inwardly directed nozzles 56e.

Windshield washer spray assembly 57 (FIGS. 12, 13, 14 and 15) includes a manifold tube 57a fixedly clamped to the inboard rear face of carriage front wall 14b and defining an inlet 57b and a plurality of laterally spaced downwardly and rearwardly directed nozzles 57c.

Bearing structure 58 (FIGS. 8, 9, and 10) includes an upper support plate 66, a lower support plate 68, meshing gears 70 and 72, upper bearing structures 74, lower bearing structures 76, upper pivot structures 78, and lower pivot structures 80. In assembled relation, upper support plate 66 is supported on and extends between front and rear angle iron carriage supports 81, the upper bearing structures 74 are secured to the underface of upper support plate 66 with the bearings 74a positioned in laterally spaced apertures 66a in the support plate; upper pivot structures 78 are journaled in bearings 74a; gears 70, 72 are sandwiched between pivot structures 76 and pivot structures 78 with nozzle arm pivot structure 56a interposed between the lower face of the gears and the upper face of pivot structures 78; bearing structures 76 are fixedly secured to the upper face of lower support plate 68 with the bearings 76a received in laterally spaced apertures 68a in the support plate; pivot structures 80 are journaled in bearings 76a; posts 82 and pillars 84 fixedly interconnect the upper and lower support plates; and bolts 86 pass through aligned apertures in pivot structure 78, gears 70, 72, pivot plates 56a, and pivot structures 80 to maintain the various elements of the pivot structure in the sandwich configuration best seen in FIG. 10 wherein the upper pivot structures are journaled in the upper bearings received in the upper support plate and the lower pivot structures are journaled in the lower bearings received in the lower support plate whereby to provide a firm, large area, long axis journal surface for the heavy nozzle arms as they undergo their pivoting butterfly movement to effect cleansing of the front and rear ends of the vehicle.

The pivotal movement of the nozzle arms is achieved (FIGS. 10, 12 and 13) by an electric motor 88 mounted on support plate 66 and driving an upward extension of the pivot structure 78 secured to gear 72 via a gearbox 80 also carried on the support plate 66 whereby actuation of motor 88 drives gear 72 and thereby meshing gear 70 whereby to move the nozzle arms through a "butterfly" or "clap hands" motion.

Equipment room assembly 16 (FIGS. 1, 2 and 11) includes a boiler 100, a hot water storage tank 102, a pump 104 driven by a variable speed motor 106 and a controller 108.

Figure 11:
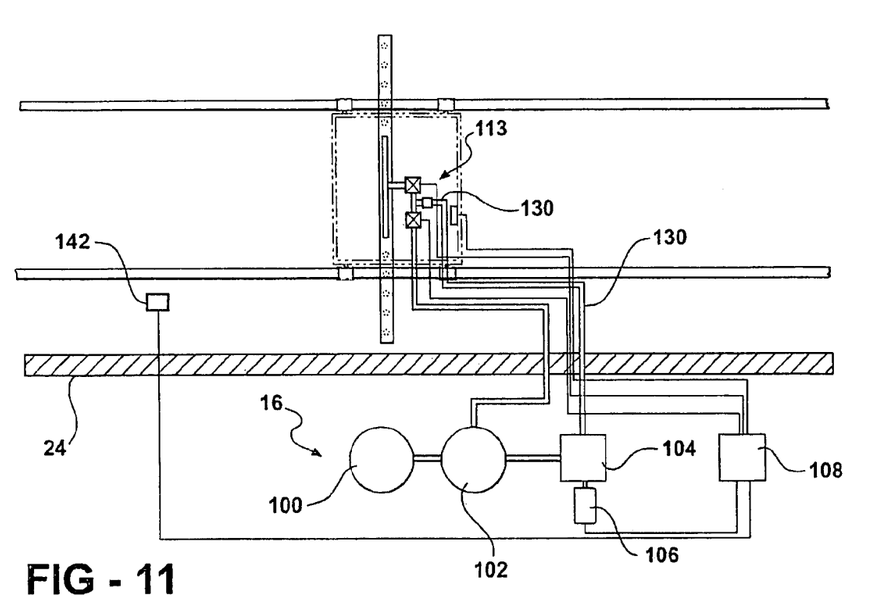
FIG. 11 is a schematic view illustrating the manner in which various energies are transported from the equipment room to the carriage of the washer.

Boiler 100 functions in known manner to heat water received from a water supply for delivery to storage tank 102 where the hot water is stored until a demand is made upon the hot water. The output of the storage tank connects to the input of pump 104.

Supply assembly 18 is designed to provide a supply of hot water, electricity and other needs from the equipment room to the carriage as the carriage moves along the guide rails between the front and rear ends of large vehicles positioned in the wash bay.

Supply assembly 18 includes a bulkhead 110, a flexible carrier 112, a valve assembly 113, and a utility bundle 114.

Bulkhead 110 (FIG. 17 and 18) has a skeletal configuration and includes a flange portion 110a fixedly secured to the under face of the cross member 36b associated with rails 34a, 34b; a horizontal main body portion 110b defining a window 110c, and a vertical connector portion 110d defining a window 110e and a plurality of utility apertures 110f of varying sizes adapted to accommodate various utility corrections.

Flexible carrier 112 (FIGS. 12, 17, 18 and 20) has a chain configuration and includes a fixed end 115, a free end 116, and a plurality of intermediate links 118.

Fixed end 115 has a clevis configuration and is fixedly secured to the upper face of the horizontal connector member 36b mounting bulkhead 110.

Free end 116 has a chain link configuration and is pivotally secured to a pair of laterally spaced lugs 120a upstanding from a mounting plate 120 fixedly secured to an upper edge of the carriage and extending in cantilever fashion outwardly over the trough 50.

Links 118 are positioned in chain fashion in trough 50 and specifically extend rearwardly in trough 50 from fixed end 115 and thereafter fold back upon themselves and extend forwardly in folded fashion for connection to plate 120 via free end 116. Each link has a cage configuration and includes oval side plates 118a interconnected by spaced upper and lower cross bars 118b. The links are pivotally secured together by pivot pins 118c.

Valve assembly 113 is positioned on support plate 66 and includes solenoid valves 122 and 124.

Utility bundle 114 is intended to provide the various energy needs of the carriage as the carriage moves along the rail structure during the course of washing a vehicle positioned in the wash bay. Utility bundle 114 in known manner may include various conduits for conducting water, chemicals, solvents, air and electricity to the carriage for use by the various corresponding devices on the carriage. Bundle 114 extends from utility room 20 through partition 24 and into the wash bay through the bulkhead 110 where the various conduits separate from the bundle and pass individually through the various apertures 110f in the bulkhead depending upon the size of the conduits, whereafter the conduits pass upwardly through window 110c and pass into the flexible carrier and specifically pass successively through each successive chain link 118 until they exit the flexible carrier at the free end 116 for routing to the suitable device on the carriage.

Specifically, a hot water hose 130 from the pump outlet 108a is routed via bundle 114 to valve assembly 113 whereat, depending upon the positioning of solenoid valves 122, 124, it may either be routed by a hose 132 to the spray nozzles on the horizontal and vertical arm portions of the nozzle carrier arms 56 or it may be returned via bundle 114 by a hose 134 to hot water storage tank 102 with the controller 108, based on a signal from a temperature sensor 136 sensing the temperature of the water arriving in the hose 130 at the valve assembly, functioning to either return the arriving water to the hot water tank or deliver the water to the nozzle spray arms depending upon whether the water arriving at the valve assembly, as determined by the temperature sensor, has reached a predetermined desired temperature suitable for the washing action. Controller 108 further functions to vary the speed of variable speed motor 106, and thereby the output of pump 104, depending on whether the pump output is being returned to the hot water source or is being delivered to the spray nozzles. Specifically, the controller may function to pump water at a relatively high rate (for example 10 g.p.m.) when the water is being recirculated back to the hot water tank and pump water at a relatively slow rate (for example 5 g.p.m.) when the water is being delivered to the nozzle spray arms. A further hose 140 arriving through the flexible carrier at the carriage may be routed to the windshield washer manifold 57 and various electrical wires arriving at the carriage through the flexible carrier may be routed respectively to the solenoid valve 122, the solenoid valve 124, the temperature sensor 136, the motor 88, and the motor 62 whereby to selectively control the various devices carried by the carriage. Note (FIG. 18) that a window 50a is provided in the floor of the trough segment proximate the front face of cross member 36a whereby to allow the various conduits to pass upwardly from the bulkhead and into the flexible carrier.

Note that the described flexible carrier arrangement allows the carriage to move the full length of the guide rail, whereby to achieve a complete washing of even an extremely long vehicle positioned in the wash area, without entangling or ensnarling any of the conduits. The flexible carrier 112 may for example be of the type know as a "Cat Trac" available from GorTrac of New Berlin, Wis., as Model Number K63-14.

With the carriage in a central or "home" position on the rails and the spray arms extending laterally outwardly from the carriage, a vehicle may enter the wash area 22a and proceed to the forward end of the wash area where the arrival of the vehicle in the wash area may be signaled, for example, by a front tire of the vehicle depressing a treadle 142 to signal the controller that a vehicle is ready for a wash cycle. The controller thereupon signals the pump 104 to begin delivering hot water through the conduit 130 to the valve assembly 113. Depending upon the temperature of the water arriving at the valve assembly 113, as sensed by the temperature sensor 136, the water will either be routed back to the storage tank via conduit 134 for further reheating or it may be routed directly to the spray arms 56. Typically, especially after a long shut down period, the water initially arriving at the valve assembly 113 will be below the predetermined temperature as determined by the sensor 136 and after appropriate opening and closing of the valves 122 and 124, will be routed back to the hot water storage tank for further heating. Once the temperature of the water arriving at the valve assembly, as sensed by the sensor 136, has reached the predetermined temperature, valve 124 is closed and valve 122 is opened so that the water arriving at the valve assembly is directed to the spray arms 56 for application to the vehicle via the downwardly directed nozzles 56c and the inwardly directed nozzles 56e. At this time the controller functions to signal the motor 62 to drive the tires 54 and move the carriage forwardly along the rail assembly with the nozzles 56c and 56e operating during this forward movement to wet the upper and side regions of the vehicle. As the carriage reaches the front end of the vehicle, as sensed by appropriate sensor mechanisms, the carriage is halted and the motor 88 is actuated to move the arms 56 in butterfly fashion around the front of the vehicle until the arms move into juxtaposition, whereafter the arms reverse their butterfly movement and return to the outwardly splayed position whereafter the carriage is moved rearwardly along the guiderails to the rear of the vehicle whereafter the butterfly movement is repeated in reverse fashion to wash the rear end of the vehicle whereafter the arms are returning to their outwardly splayed position and the carriage returned to its home position. This procedure will of course be repeated many times for a typical washing cycle to accomplish wetting, washing, chemical application and other processes related to the required washing operation.

Figure 16:
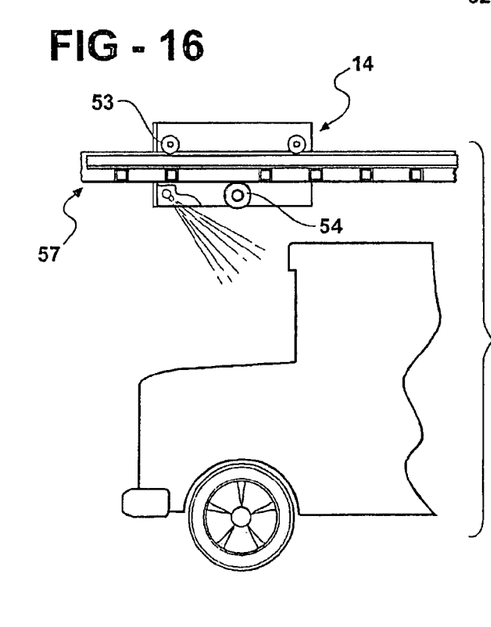
Figure 17:
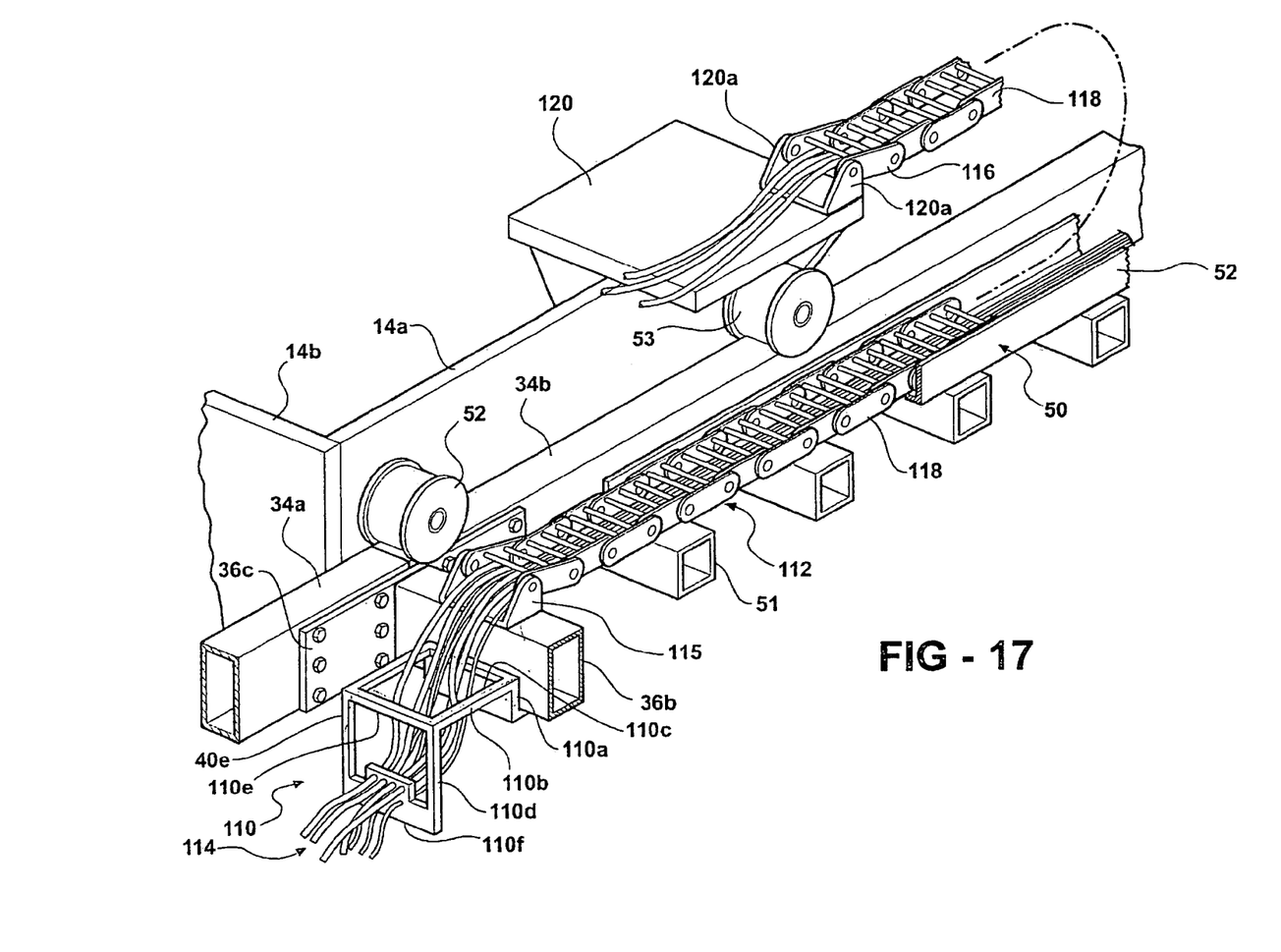
FIGS. 17, 18, 19, 20 and 21 illustrate a flexible carrier utilized in the routing of the various energies from the equipment room to the carriage.
Figure 18:
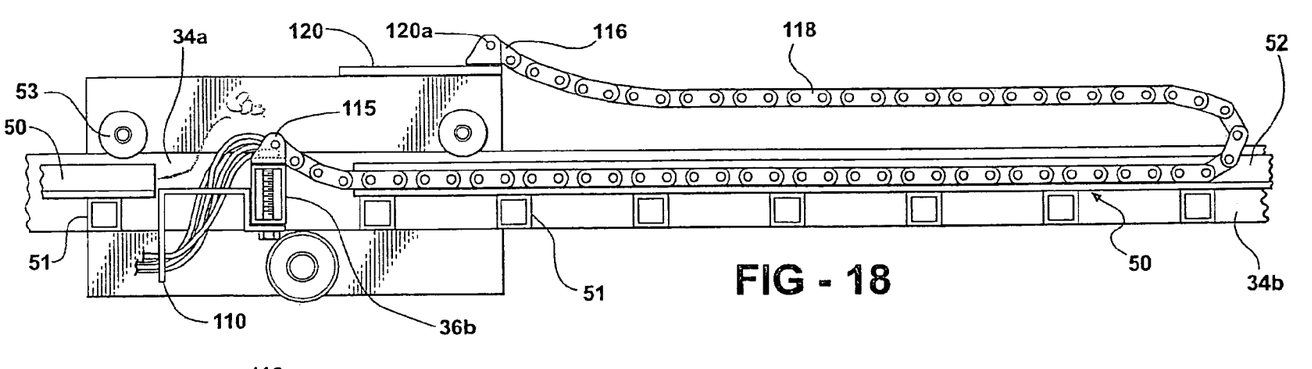
Figure 19:
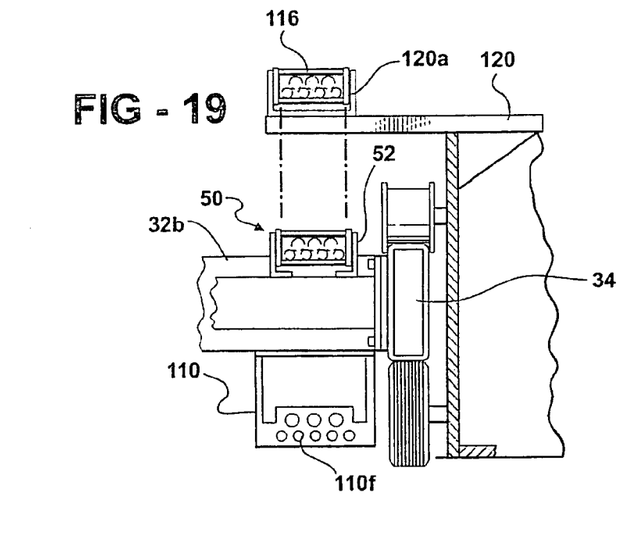
Figure 20:
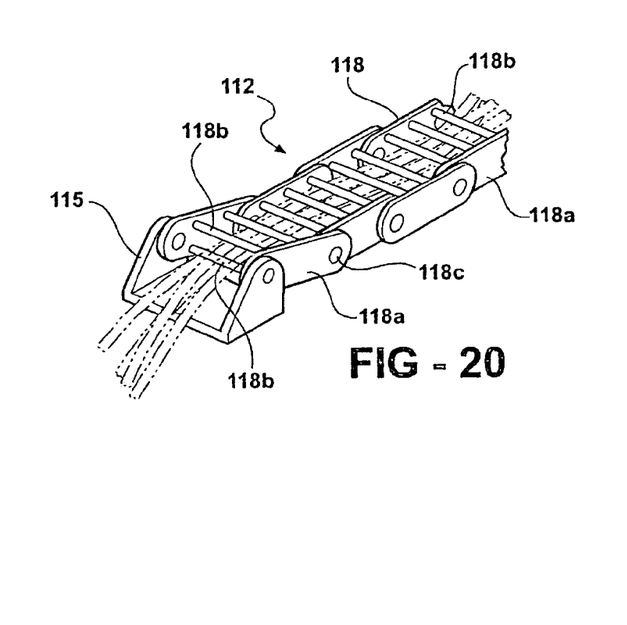
Figure 21:
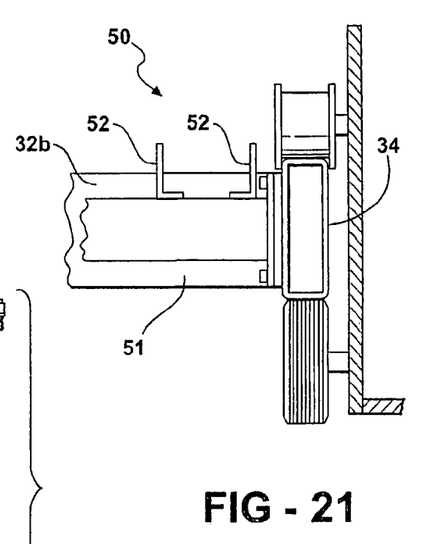

If the vehicle being washed is a vehicle with a recessed windshield, such for example as the bus seen in FIG. 16, the carriage may be halted in a position immediately forwardly of the windshield whereupon the windshield spray assembly 57 may be utilized to direct fluids downwardly and rearwardly against the windshield to thoroughly cleanse the windshield with the laterally spaced nozzles 57c operating to insure that the entire lateral expanse of the windshield is thoroughly cleaned.

The vehicle washer of the invention will be seen to successfully address many of the problems that are unique to a vehicle washer specifically designed to wash large vehicles such as large trucks and large buses.

Specifically, the invention provides a rollover washer wherein the water arriving at the carriage for distribution to the spray device is assured to be at a predetermined hot temperature irrespective of the length of the water conduit interconnecting the carriage and the hot water source. The invention further provides a system whereby the carriage may move over even very large vehicles from front to rear of the vehicle with assurance that all of the various conduits extending from the equipment room to the carriage will remain unsnarled and viable. Further, the invention washer provides adequate bearing support for the very large nozzle spray arms required to achieve washing of the large vehicles. Further, the invention provides a structure whereby an extremely long guide rail may be provided for the carriage utilizing relatively short sections while eliminating any interruption in the upper surface in the rail sections at the splice joints. Further, the invention washer insures that even recessed windshields on relatively large vehicles will be adequately cleansed.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. For example, although the guide rails are illustrated and described as being formed from two rail sections butted together, it will be apparent that further rail sections could be employed to provide a greater length wash apparatus.

What is claimed is:

1. A method of supplying hot water to a spray device of a vehicle wash system of the type including a source of hot water at a first location, a spray device at a second location remote from the first location, conduit means interconnecting the source and the spray device, and a selector valve assembly in the conduit means proximate the spray device wherein the method comprises;
    sensing the arrival of a vehicle at a wash area of the wash system and generating a signal representing such arrival;
    using the signal to start the flow of wafer from the source to the valve assembly;
    recirculating water from the valve assembly back to the source while preventing the flow of water from the valve assembly to the spray means for a period of time after said signal is generated; and, thereafter,
    using the selector valve assembly, stopping the recirculation of water back to the source while supplying water to the spray means.

2. A method according to claim 1 wherein:
    the vehicular wash system further includes a carriage moveable reciprocally over the wash area; and
    the spray device and valve mechanism are mounted on the carriage.

3. A method according to claim 1 wherein:
    the step of recirculating water to the source is carried out at a higher flow rate than the step of supplying the spray means.

4. A method of washing vehicles with liquid at or above a predetermined temperature comprising the steps of:
    (a) causing liquid to flow from a supply which is maintained at or above the predetermined temperature toward a valve assembly proximate a washing apparatus;
    (b) sensing the arrival of a vehicle at the washing apparatus and using a signal produced by such sensing to start the flow of liquid from the supply to the valve assembly;
    (c) recirculating liquid which has been caused to flow to the valve assembly to the supply for a time while at the same time preventing flow of the liquid to the washing apparatus; and thereafter,
    (d) using the valve assembly to direct the liquid to the washing apparatus while preventing further recirculation.

5. The method of claim 4 wherein the recirculation flow is at a higher flow rate than the flow to the washing apparatus.

* * * * *